A. Pearl's Imp't in Molds for Shaping Cigar Bunches.

No. 117,200.

Patented Jul 18 1871.

Witnesses:
Henry T. Brown
Fred. Haimer

Adolph Pearl

UNITED STATES PATENT OFFICE.

ADOLPH PEARL, OF BROOKLYN, NEW YORK.

IMPROVEMENT IN MOLDS FOR SHAPING CIGAR-BUNCHES.

Specification forming part of Letters Patent No. 117,200, dated July 18, 1871.

*To all whom it may concern:*

Be it known that I, ADOLPH PEARL, of the city of Brooklyn, in the county of Kings and State of New York, have invented a new and useful Improvement in Molds for Shaping Cigar-Bunches; and I do hereby declare that the following is a full, clear, and exact description of the same, reference being had to the accompanying drawing.

This invention relates to molds for shaping the "bunches" or inner portions of cigars preparatory to their receiving the wrapper, and may be considered as an improvement upon the mold for which I have obtained Letters Patent of the United States dated October 11, 1870. It consists in a longitudinally-divided mold made of a composition such as is hereinafter described, lined with cedar, the object of such lining being twofold, viz., to prevent the flavor of the tobacco from being affected by coming in contact with the composition of which the mold is formed, and to give the cigar the cedar flavor which is so highly appreciated, and which has heretofore been obtained by packing cigars in cedar boxes.

Figure 1:
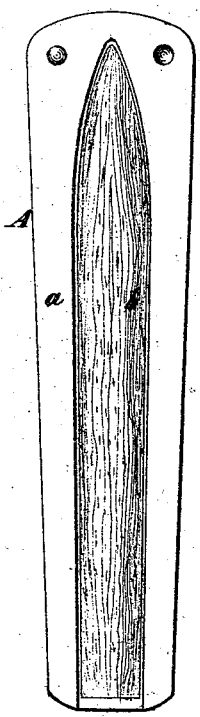
Figure 2:
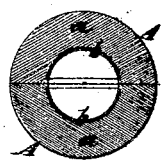

Figure 1 in the drawing is an exterior face view of one-half of my improved mold. Fig. 2 is a transverse section of the mold.

Similar letters of reference indicate corresponding parts in both figures.

A A are the halves or sections of which the mold is composed, each composed of a body, *a*, and the cedar lining *b*. The body *a* may be made of a composition of sawdust and starch, or of shellac, resin, and sawdust, or other fibrous material, or any composition which is rendered plastic by moisture or heat, so that it can be molded into the requisite shape, and which, when dry or set, will retain its shape. The cedar lining is composed of a thin cedar veneer. One-half of the body *a* is made with dowel-pins *c c* on its flat surface or joint-plane to fit corresponding holes in the other half for the purpose of matching the halves of the mold. To form each half A of the mold a matrix, of metal or other suitable material, corresponding in its interior form with the exterior of the mold, and a core, of metal, which corresponds in its form with one-half of the cigar-bunch to be produced. To produce the half-mold A a suitable quantity of the plastic composition is placed in the matrix, and a piece of cedar veneer of suitable size and shape to form the lining *b* is placed on the surface thereof. The core is then laid on the veneer and the cover put on the matrix, and suitable pressure is applied to make the core press the lining into the proper shape and form in the mold, the cedar-lined cavity corresponding in form with half of the cigar-bunch to be produced. The mold, instead of being made of halves or sections, as above described, may be made of three or more sections, as described in my Letters Patent dated October 11, 1870, and is to be used in the same way as is described in the specification of those Letters Patent.

I do not claim, broadly, a mold for cigar-bunches having an absorbent lining; but

What I claim as my invention, and desire to secure by Letters Patent, is—

A cedar-lined mold for cigar-bunches, composed of a composition body and cedar lining, substantially as herein described, for the purpose set forth.

ADOLPH PEARL.

Witnesses:
GEO. ST. GEORGE, Jr.,
HENRY T. BROWN.